US007886639B2

(12) United States Patent
Mitchell et al.

(10) Patent No.: US 7,886,639 B2
(45) Date of Patent: Feb. 15, 2011

(54) ROLL CUTTING APPARATUS

(75) Inventors: Christopher G. Mitchell, Farfield, ME (US); Todd R. Morrison, 26 Cottage Park Rd., Portland, ME (US) 04103

(73) Assignee: Todd R. Morrison, Portland, ME (US)

( * ) Notice: Subject to any disclaimer, the term of this patent is extended or adjusted under 35 U.S.C. 154(b) by 0 days.

(21) Appl. No.: 12/434,164

(22) Filed: May 1, 2009

(65) Prior Publication Data

US 2009/0249928 A1 Oct. 8, 2009

Related U.S. Application Data

(60) Division of application No. 10/861,627, filed on Jun. 4, 2004, now Pat. No. 7,526,984, which is a continuation-in-part of application No. 10/454,886, filed on Jun. 5, 2003, now abandoned.

(51) Int. Cl.
*B23B 3/00* (2006.01)
*B23B 13/12* (2006.01)

(52) U.S. Cl. .......................................... 82/1.11; 82/47

(58) Field of Classification Search .................. 82/1.11, 82/47, 54, 70.1, 99.1, 113
See application file for complete search history.

(56) References Cited

U.S. PATENT DOCUMENTS

| | | | | |
|---|---|---|---|---|
| 3,107,564 | A * | 10/1963 | Coker et al. | 82/101 |
| 3,353,818 | A | 11/1967 | Hill | |
| 3,356,205 | A * | 12/1967 | McLeod | 198/692 |
| 3,386,678 | A | 6/1968 | Malone | |
| 4,292,867 | A * | 10/1981 | Stoffels et al. | 82/47 |
| 4,412,401 | A * | 11/1983 | Fundell | 451/242 |
| 4,625,464 | A * | 12/1986 | Kubo | 451/441 |
| 5,271,137 | A | 12/1993 | Schutz | |
| 5,289,747 | A * | 3/1994 | Wunderlich | 83/38 |
| 5,453,070 | A * | 9/1995 | Moody | 493/288 |
| 5,964,024 | A * | 10/1999 | Wallace | 29/558 |
| 6,269,719 | B1 | 8/2001 | Easton et al. | |
| 6,938,313 | B2 * | 9/2005 | Viola et al. | 29/33 T |

FOREIGN PATENT DOCUMENTS

DE 4439605 C1 1/1996

* cited by examiner

*Primary Examiner*—Will Fridie, Jr.
(74) *Attorney, Agent, or Firm*—Patricia M. Mathers

(57) ABSTRACT

A method for cutting an industrial-size roll of paper or other sheet material into two or more rolls is disclosed. The method enables sections to be cut from the roll, without first having to remove a previously cut section from the roll. The roll is supported on two parallel rollers. A circular saw is mounted in a saw frame that travels along a carriage and positions the saw blade at any desired cutting position on the roll. The saw blade has a radius large enough to cut through such a roll in a single cut, leaving press-ready rolls that require no finish-trimming on the ends.

4 Claims, 12 Drawing Sheets

ROLL CUTTING APPARATUS

BACKGROUND INFORMATION

1. Field of the Invention

The invention relates to the field of processing large rolls of sheet material. More particularly, the invention relates to cutting such large rolls. More particularly yet, the invention relates to sub-dividing an industrial-size roll of sheet material into two or more individual rolls.

2. Description of the Prior Art

Paper for the printing industry is provided on rolls of various widths. Often, it is necessary to re-size a roll from its original state, that is, to reduce the width of the roll, or to cut an end from a roll of paper that has been damaged. The conventional method of re-sizing such a roll is to run the paper through a rewinder. This process entails feeding the paper through a slitter that cuts the paper to the desired width with a blade, and rewinding the slit or cut material onto one or more rolls, as applicable. One of the largest industrial-size rolls of paper has a diameter of 72 inches and a paper width of 138 inches. Rolls this large are typically not re-sized on a rewinder, because the rewinder equipment for handling such large rolls would be extremely costly and space-consuming. Also, the rolls that require re-sizing are often not at a facility that has a rewinder. Because such rolls are extremely large, heavy, and difficult to handle and to transport, it is very costly and time-consuming to ship them to a facility that does have a rewinder. Thus, the rolls are generally re-sized on location, by cutting the rolls with a chain saw to the approximate size and then finishing the ends of the cut rolls in a finish or trim process. Because of the complexity and large number of components that are need in rewinding equipment, it is not feasible to construct a rewinder that is a mobile unit.

Special roll-cutting machinery is used to cut and re-finish industrial-size paper rolls. In U.S. Pat. No. 6,269,719 B1, Easton et al. discloses machinery that is used to cut a roll into a narrower roll. The Easton et al. machinery provides a horizontal bed that supports a roll of paper and a rotary arm unit that includes a circular saw. The saw is mounted in such a way that it can be positioned along the roll only a few inches in from the end of the roll. Furthermore, the radius of the saw blade is small, typically with a 10-inch radius and, thus, much smaller than the radius of an industrial-size roll. In order for the saw to be able to cut across the cutting plane in toward the center of the roll, the material that has been cut must be removed rather quickly from the roll. To facilitate removal of this material, radial slices are cut into the end of the roll with a chain saw or a handheld circular saw to the approximate depth of the desired cut before the cut is made. As the saw cuts in from the outer perimeter, strips of the trimmed waste paper drop off or are pulled off and are discarded as waste paper and/or recycled.

U.S. Pat. No. 5,964,024 (Wallace; 1999) discloses apparatus that includes a roll cutter that is similar in purpose to that of the Easton et al. roll-cutting machine, but with the roll of paper supported in a vertical position on a rotating base. As with the Easton et al. machinery, the saw is small, relative to the diameter of the roll to be cut. A second, hand-operated circular saw may be used to cut radial cuts into the end of the roll to a depth of the desired trim cut, so that the paper may be quickly removed as the saw travels inward toward the core. In this case, because the roll is supported vertically, spacers are inserted into the cut as the saw moves in toward the core, to prevent the upper part of the roll from slipping down and binding the saw. And again, if a wide roll of paper is to be divided into two or more rolls, a chain saw is used to first cut through the original roll at the approximate locations of the desired cut or cuts and the ends of each roll are then trimmed in separate operations.

Both the Easton et al. and Wallace equipment are provided as mobile units. That is, the roll-cutting machinery is mounted on a transport vehicle and brought to the location of the rolls that are to be cut. Thus, the facility that processes such rolls collects and stores the rolls and, at intervals, calls upon the roll-cutting service. This, of course, requires space, roll-handling equipment, and administrative effort to store and keep track of the rolls, in order to determine when it is economically feasible to hire the roll-cutting service to come with the roll-cutting machinery and cut the rolls.

The conventional roll-cutting machinery and methods of cutting, whether the rewinder operation or the cutting operations described above, have disadvantages that make it a difficult or costly process to reduce the width of a roll. The rewinder method requires sophisticated equipment that makes this method not practicable as a mobile unit, so that the owner that processes such large industrial size rolls must either have the rewinder equipment permanently installed to slit, or must ship the rolls to a location that provides that service. This, again, is very costly because of the transportation costs. Furthermore, it is critical that the rewinding be done properly, as improperly wound paper can dramatically change the physics of the originally manufactured roll, making it unusable for its intended purposes.

It is known in other industries to use a large circular saw blade to cut through a large cylindrical form of material. Saw blades used in the lumber industry come to mind. None of the known blades is capable of cutting through a large, industrial-size roll of paper in a single-cut operation, leaving one or more rolls with smooth, finished, press-ready ends that require no further trimming or other operations to prepare them for subsequent processing.

What is needed, therefore, is machinery that efficiently cuts rolls in a single-cut operation and leaves a press-ready roll with a smooth, finished roll end that requires no further trimming or other end-finishing operations. What is further needed is such machinery that is capable of sub-dividing a roll into narrower rolls, with little or no waste. What is yet further needed is such machinery that accepts rolls in a wide range of widths and is adaptable to cut through a roll at virtually any location along the width of the roll.

BRIEF SUMMARY OF THE INVENTION

For the reasons cited above, it is an object of the present invention to provide saw apparatus that efficiently cuts rolls in a single-cut operation, leaving a press-ready roll with a smooth and finished roll end. It is a further object to provide such apparatus that is adaptable to subdivide a roll into narrower rolls, generating little or no waste. It is a yet further object to provide such apparatus that is adaptable to accept rolls in a wide range of widths and to cut through a roll at any location along the width of the roll.

The objects of the invention are achieved by providing saw apparatus that is adapted to cut a roll to a particular size or to cut two or more rolls from a wide roll. Note that although the apparatus is described hereinafter as a saw for cutting a paper roll, the saw apparatus may be used for cutting rolls of various types of web or sheet material, such as plastic film, carpeting or flooring material, etc.

The saw apparatus according to the invention comprises a circular saw for cutting the roll, a load-bearing unit for holding the roll in position for cutting, and roll-placement means for placing the roll in the load-bearing unit. The circular saw has a radius sufficiently large to cut through an industrial-size paper roll, without having to remove cut material from the roll during the cutting operation, and is mounted on a saw frame that travels parallel to the load-bearing unit and is positionable for a cutting operation at any location along the width of a roll that is held in the load-bearing unit. Thus, the saw apparatus provides means for subdividing the roll into two or more rolls of virtually any desirable width.

For purposes of clarity in the subsequent descriptions, the footprint of the apparatus is defined as being substantially rectangular, with the narrow ends of the rectangle being referred to as a first end, which is a home position, and a second end, and with the sides of the rectangle being referred to as an entrance side and an exit side. The saw frame resides in the home position when not in use. The roll to be cut is brought to the apparatus on the entrance side, rotatably mounted in the load-bearing unit, and then discharged from the saw apparatus either to the entrance side or the exit side, depending on the particular roll-placement means incorporated into the apparatus. Generally, paper (or other sheet material) is wound around a hollow core to form the roll. The ends of the roll may be mounted directly on shaftless chucks in the load-bearing unit, or, a shaft, such as an air shaft with expandable lugs or buttons, may first be inserted into the hollow core of the roll and the shaft mounted in chucks. The end of the roll that is located toward the first end of the apparatus serves as a reference position for measuring an intended location of a cut.

The load-bearing unit comprises a rectangular load beam with two load arms that are mounted on one face of the beam. The load beam has a length that extends most of the distance between the first end and the second end of the apparatus, with a first load-beam end being near the home position, a second load-beam end near the second end of the apparatus, and a longitudinal axis of the load beam extending therebetween. One or both of the load arms are slidably mounted on an adjustment mechanism that extends parallel to the longitudinal axis. Depending on the particular installation of the saw apparatus, one of the load arms may instead be fixedly mounted at the first load beam end, with the second load arm being slidably mounted. The distance between the load arms is adjustable by selectively positioning the slidably-mounted load arm or arms on the adjustment mechanism at a distance that will accommodate the specific length of the roll to be cut. A chuck is mounted at the upper end of each load arm.

The roll-placement means is used to place the roll of paper to be cut in the load-bearing unit. The invention encompasses several roll-placement means. A first roll-placement means includes a positioning assembly that rotates the load beam into a roll pick-up position and back into a cutting position. The positioning arms are mounted on the load beam, and as the arm rotates, the load beam is also rotated about its longitudinal axis. Extending from each end of the load beam, essentially parallel and co-axial to the longitudinal axis of the load beam, is a load journal that is supported by support bearings. Each journal supports a positioning assembly, which comprises at least one positioning cylinder, a lever arm, and at least one positioning arm. The lever arm is fixedly keyed to the journal and pivotably linked to the positioning cylinder which is connected to the positioning arm. Extending or retracting the piston on the positioning cylinder causes the positioning arm to rotate about the journal, which forces the rectangular load beam to rotate about its longitudinal axis between the roll pick-up position, in which the load arms are in position for receiving and picking up the roll, and the cutting position, in which the load arms support the roll in position for cutting. Subsequent to the cutting operation, the roll-placement means is again actuated to rotate the load beam into the roll-pickup position, in order to release the cut rolls from the load-bearing unit.

A second roll-placement means includes a load table placed on the entrance side of the load-bearing unit, an exit table on the exit side, a height-adjustable support bed or cradle mounted above and parallel to the load beam, and kicking cylinders. With this embodiment of the roll-placement means, the load beam is fixedly, i.e., non-rotatably, mounted in the center of the rectangle of the saw apparatus, parallel to the entrance and exit sides. The load arms are height-adjustable, allowing the chucks at the ends of the load arms to be brought into position to receive rolls of different diameters. The support bed bears the weight of the paper roll while the load arms are brought into position to hold the ends of the rolls during cutting. The kicking cylinders are also height adjustable and are used to guide the roll from the load table onto the support bed and then onto the exit table.

The load arms serve to hold the roll in the proper longitudinal position for cutting, that is, they prevent the roll from shifting in a longitudinal direction. Large industrial-size paper rolls are extremely heavy and the support bed serves to relieve the load arms of the load and to maintain a horizontal alignment of the roll during the cutting process. Various means are suitable as the support bed. It is important that the roll rotate during the cutting operation; it is less critical whether the means of rotation are provided by the chucks or by rollers in the support bed. Ideally, the supports on the support bed are height-adjustable to guidingly support the roll of a particular diameter and to accommodate slight out-of-round conditions of the roll. The direction of rotation is generally in the same direction of rotation as that of the saw blade at the point of contact of the saw blade. Depending on the type of material wound on the roll and the configuration of the saw blade, it may be desirable to have the roll rotate in a direction opposite to the direction of rotation of the saw at the point of contact.

The saw frame is mounted on the carriage rails and held in the home position until the saw blade is to be positioned at some intended location of cut between the home position and the second load-beam end. It is within the scope of the invention to provide the saw frame as a tower in which the saw blade is supported at a height greater than the expected greatest diameter of a roll to be handled by the saw apparatus, so that the saw blade, once positioned over the intended location of cut, is lowered into the roll. It is also within the scope of the invention to provide the saw frame as a floor frame in which the saw blade is supported laterally to the support bed, with the center of the blade parallel and at approximately the same height as the longitudinal axis of the roll shaft of the roll when held in the load arms. The saw blade is then moved in toward the core of the roll at the intended location of cut. Another configuration of the saw unit includes installing the saw frame in a pit beneath the area where the roll is supported in the cutting position, and raising the saw to cut through the roll. Still another embodiment of the apparatus according to the invention provides a saw frame that is stationary and a load-bearing unit that is mounted on a carriage system and positions the roll to be cut at an operating location of the saw blade.

One danger of cutting material, particularly paper, is that the heat caused by the friction of the blade against the material is great enough to cause the material being removed to weld to the cutting surfaces of the saw blade or to the material being cut. The size of the saw blade used in the apparatus according to the invention is so great that the body of the saw blade serves as an effective heat sink, that is, heat of friction is rapidly absorbed away from the saw teeth into the body of the blade and, as a result, the saw blade remains cool. This reduces significantly the amount of heat that is transferred from the teeth to the material being cut, thereby reducing the likelihood that the material being removed will weld to the saw or to material on the roll. Nevertheless, depending on the type of material being cut, it may be desirable to provide a lubricant-coolant to the saw blade to cool the blade. A suitable coolant-lubricant is ACCU-LUBE™, manufactured by ACCU-LUBE Manufacturing GmbH. The lubricant is sprayed as a fine mist onto the teeth at the top of the saw blade. The lubricant dries as the blade spins so that, by the time the teeth coated with the lubricant reach the surface to be cut, the lubricant has already dried and, thus, does not stain or damage the material being cut.

It is also within the scope of the invention to provide saw apparatus that has a support means, such as a support bed, mounted directly on the floor, which allows the roll to rotate during the cutting operation, but does not have the load-bearing unit and the roll-placement means described above. Rolls that are large in diameter, but not very long, are manageable with a conventional roll-handling truck, typically referred to as a clamp truck, that is used to pick up and transport rolls for short distances. In this scaled-down version of the saw apparatus, the carriage system for the saw frame extends alongside a support bed that has several long rollers on which the roll is rotatably supportable. For example, in a support bed having four long rollers, one or two of the long rollers are driven rollers, while the remaining long rollers are follower rollers.

Operation of the apparatus according to the invention is as follows: To load the roll, it is placed alongside and parallel to the load beam on the entrance side of the saw apparatus. If the first roll-placement means is used, the roll is placed on the floor, in position to be picked up by the load arms. Depending on the type of chucks used, shaftless chucks or conventional chucks for receiving a shaft, the roll is either supported on the noses of the shaftless chucks or a roll shaft is inserted into the hollow core and the ends of the roll shaft clamped between the two chucks. The positioning assembly is then actuated to force the load beam to rotate about its longitudinal axis toward the entrance side, so as to bring the upper ends of the load arms down to a position that will allow the ends of the roll shaft to be secured in chucks provided in the load arms. The positioning assembly is then actuated to force the load beam to rotate in the opposite direction, toward the back side of the apparatus, in which the roll is positioned above the support bed. If the support bed is fitted with height-adjustable supports, these are adjusted to guidingly support the roll of a particular diameter. The weight of the roll is born by the support bed, while the load arms, although providing some support to the roll, primarily maintain proper alignment of the roll. The nose on the shaftless chucks or the air shaft are fitted with expandable lugs or buttons which, when inflated with air, prevent the roll from shifting radially and/or longitudinally, which is critical, as any deflection would cause the saw blade to bind during the cutting operation and would result in gouging cuts in the edge of the roll.

If the second roll-placement means is used, the roll is placed on the load table and rolled onto the support bed, which is in its raised position. The kicking cylinders prevent the roll from rolling onto the exit table. The kicking cylinders are then actuated to guide the roll onto the support bed. Depending on the size and weight of the roll, the support bed, which is supported by hydraulic cylinders, may be lowered to a position in which the cylinders are fully retracted and resting on bearing stops. The roll is fitted onto the load-bearing unit as described above.

Once the roll is in the support bed and ready for cutting, the saw frame is moved along a carriage system until the saw blade is positioned at the location of the desired roll cut. The saw blade is driven through the rotating roll, including through the core, to completely sever a section of the roll from the rest of the roll. The saw blade is large enough to cut through a roll of industrial-size paper in a single-cut operation, leaving press-ready rolls with smooth ends that generally require no further finishing. Because the saw blade is positionable all along the length of the load beam, a series of cuts may be made in the roll, thereby subdividing the roll into multiple rolls that are ready for use. Depending on the roll-placement means employed, the cut rolls are either kicked out to the exit table or the load beam is rotated back to the roll-pickup position, in order to release the cut rolls onto the floor.

In the scaled-down version of the saw apparatus, the roll is placed on the support bed by the roll-handling truck, and the saw frame driven along the carriage system to the desired location of cut on the roll. The roll is rotated on the support bed during the cutting operation.

The ends of the paper rolls cut with the saw apparatus according to the invention are very smooth and, in most cases, the roll is press-ready. In some paper processing operations, however, it may be desirable to have an extremely smooth finish on the ends of the cut paper rolls. In this case, a finishing station may be provided, either as a processing station that is integrated into the production line, or as a separate finishing station. The finishing station comprises a tower on which a sander unit is mounted. The lower half of the tower has a height-adjustable roll mounting assembly that includes a shaftless chuck for holding the cut paper roll. The sander unit is height-adjustably mounted in the upper half of the tower, and includes a sanding disc and a hydraulic motor. The cut roll is mounted on the chuck and raised off the floor, and the sander unit lowered so that the operative surface of the sanding disc is up against the face of the cut roll end. A depth adjustment means is provided on the sander unit, for adjusting the depth of material removal from the cut roll end.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

Figure 1:
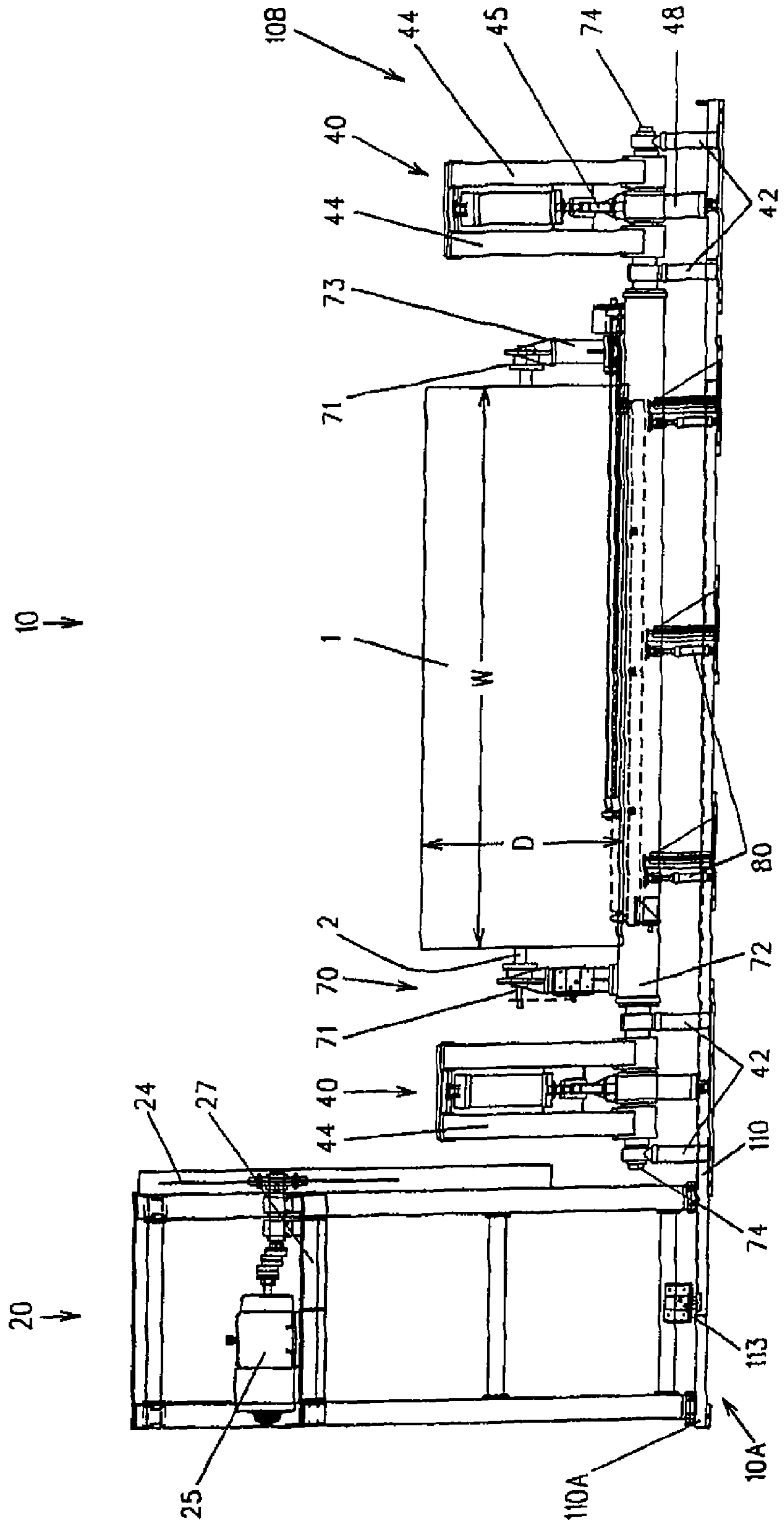
FIG. 1 is a front view of the first embodiment of the saw apparatus according to the invention.
Figure 2:
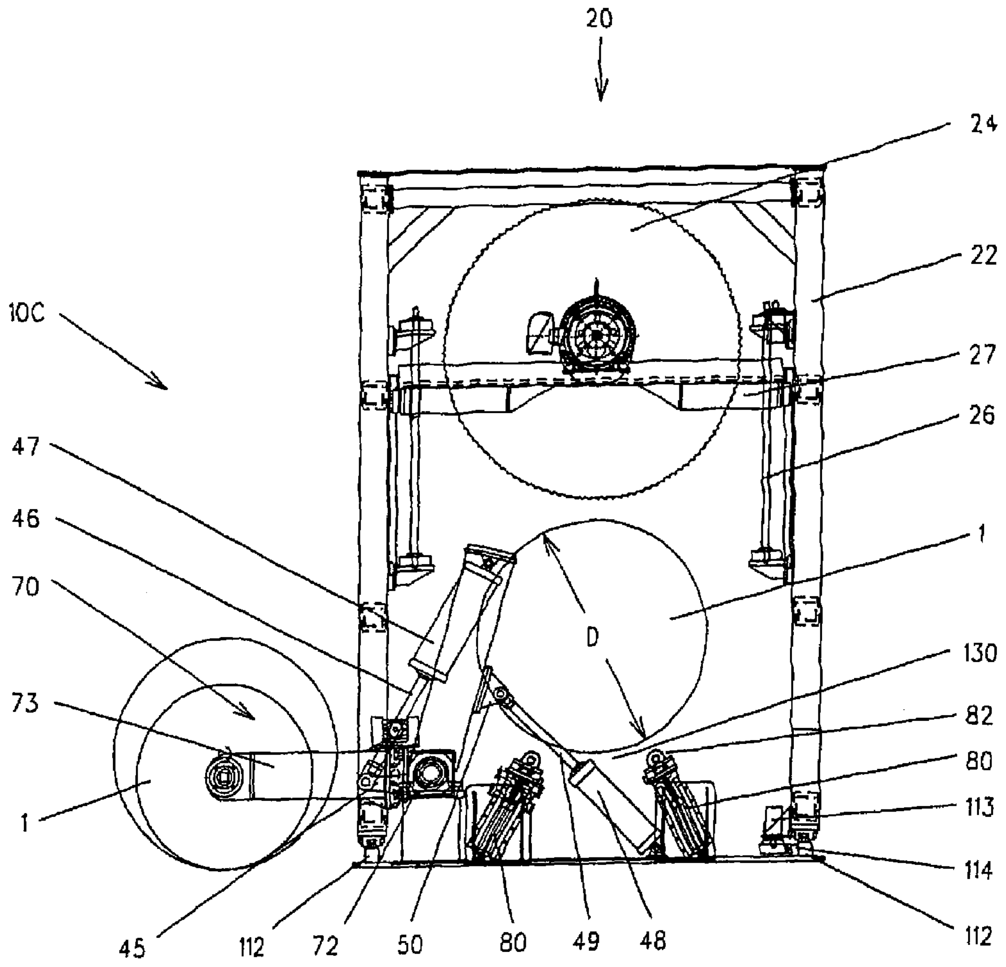
FIG. 2 is an end view of the apparatus of FIG. 1, showing the saw frame, the support bed, and a side view of the load arm and positioning assembly.

FIGS. 1 and 2 illustrate a first embodiment of a saw apparatus 10 according to the invention. The saw apparatus 10 comprises a saw unit 20, a carriage system 110, a positioning assembly 40, and a load-bearing unit 70. For the sake of illustration, the operation of the saw apparatus 10 will be described hereinafter with reference to sawing through a roll 1 of paper, in order to re-size the roll. The roll 1, as shown in FIG. 1, is a standard, industrial-sized paper roll having a roll diameter D of approximately 50 inches and a roll width W of approximately 138 inches, although the saw apparatus is adaptable to processing rolls up to 72 inches in diameter. The saw apparatus 10 according to the invention may, of course, be used to cut or re-size smaller rolls, and indeed, generally may be used to cut very large and/or heavy cylindrical-shaped material, including rolls and log-shaped material that lend itself to cutting with a circular saw blade.

Figure 3:
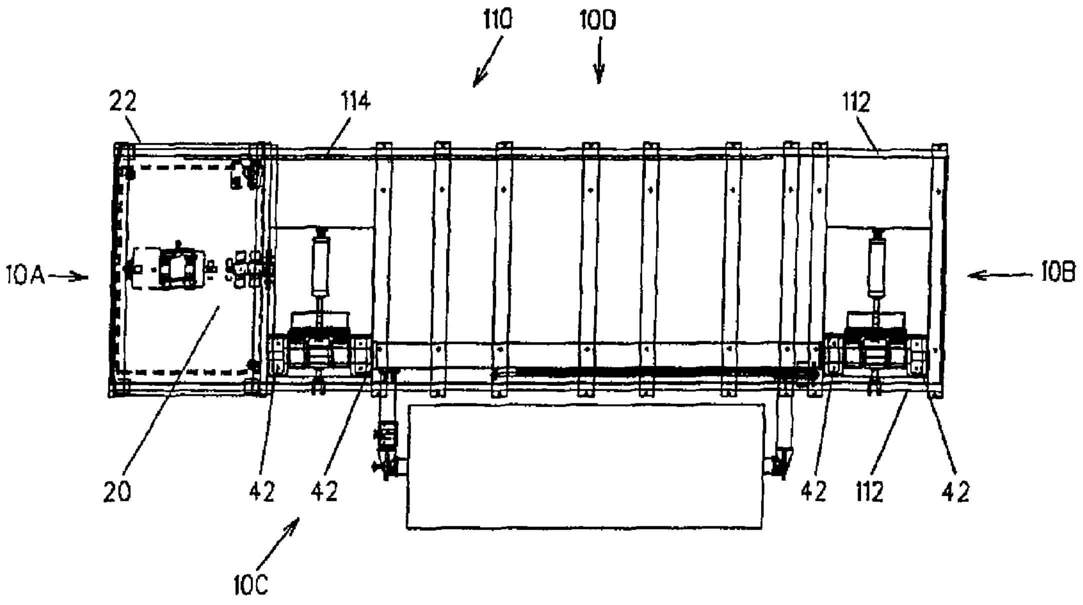
FIG. 3 is a plane view of the carriage system.

FIG. 3 is a schematic illustration of the carriage system 110, showing the carriage rails 112 and a rack 114. As shown, the two parallel carriage rails 112 generally define a rectangular area that encompasses the saw unit 20. in the embodiment shown, the saw unit 10 includes a frame 22 that is mounted on the carriage rails 112 and moved along the rails carriage 112 by means of a drive system that is a rack-and-pinion assembly (only a rack 114 shown in FIG. 3) that is connected to the frame 22 and is driven by a motor 113 (shown in FIG. 1). The drive system, with motor, is well-known and is not discussed in any detail herein. Furthermore, the invention encompasses the use of other suitable means of driving the frame 22 along the carriage rails 112.

For purposes of clarity, the footprint of the first embodiment of the saw apparatus 10 is also illustrated in FIG. 3. The upper end of the rectangle that encompasses the saw apparatus 10, which is also a home position of the saw frame 20, is referred to hereinafter as a first end 10A; the left-hand side of the rectangle, i.e., to the left of the load beam 72 (shown only schematically with dashed lines), is referred to as an operator side 10C; the opposite side of the load beam 72 is referred to as a back side 10D, and the lower, narrow end of the rectangle is referred to as a second end 10B of the saw apparatus 10.

Referring again to FIGS. 1 and 2, the saw unit 20 is shown in a home position at the first end 10A of the saw apparatus 10. A saw blade 24 is mounted on a saw frame 27 that, in this first embodiment, is a tower frame. The saw blade 24 is mounted on a platform that is movably supported on a plurality of ball screws 26. In the embodiment shown, the saw blade 24 is a large blade with a radius of 32 inches, made by Specialty Saw, Inc. of Simsbury, Conn., and adapted to provide a press-ready finish on a cut end of the roll 3 in a single-pass cutting operation. A drive system, such as an electric or a hydraulic motor, is used to drive the ball screws 26 to adjust the height of the platform, thereby controlling the height of the saw blade 24 and the downward saw feed rate. It is well-know to use drive systems with ball screws to control feed rate, therefore the drive system is not shown or described in detail herein.

Figure 4:
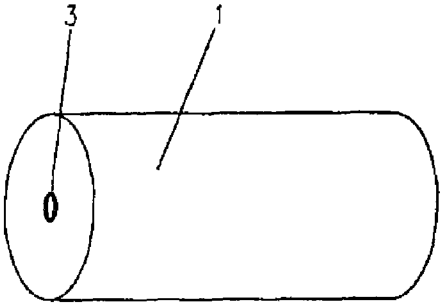
FIG. 4 PRIOR ART
FIG. 4 is an illustration of a conventional paper roll with a fiber core. (Prior Art)
Figure 6:
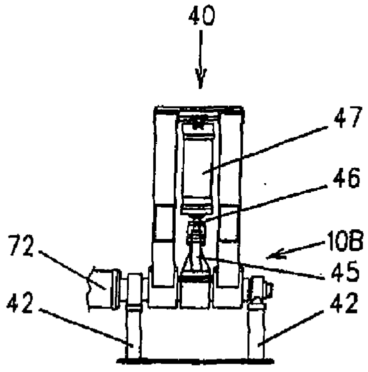
FIG. 6 is a front view of the positioning assembly.

FIG. 4 (prior art) illustrates a roll 1 wound on a core 3. The core 3 in the embodiments shown is a fiber core typically used with paper rolls. Shown in FIGS. 1 and 2 are the load-bearing unit 70 and two positioning assemblies 40, one positioning assembly 40 mounted on each end of the load beam 72. A roll shaft 2 extends through the core 3 of the roll 1. Each end of the roll shaft 2 is rotatably mounted in a safety chuck 71 at the upper end of a load arm 73 and the two load arms 73 are rigidly mounted on a top face 72A of a rectangular load beam 72.

Figure 5:
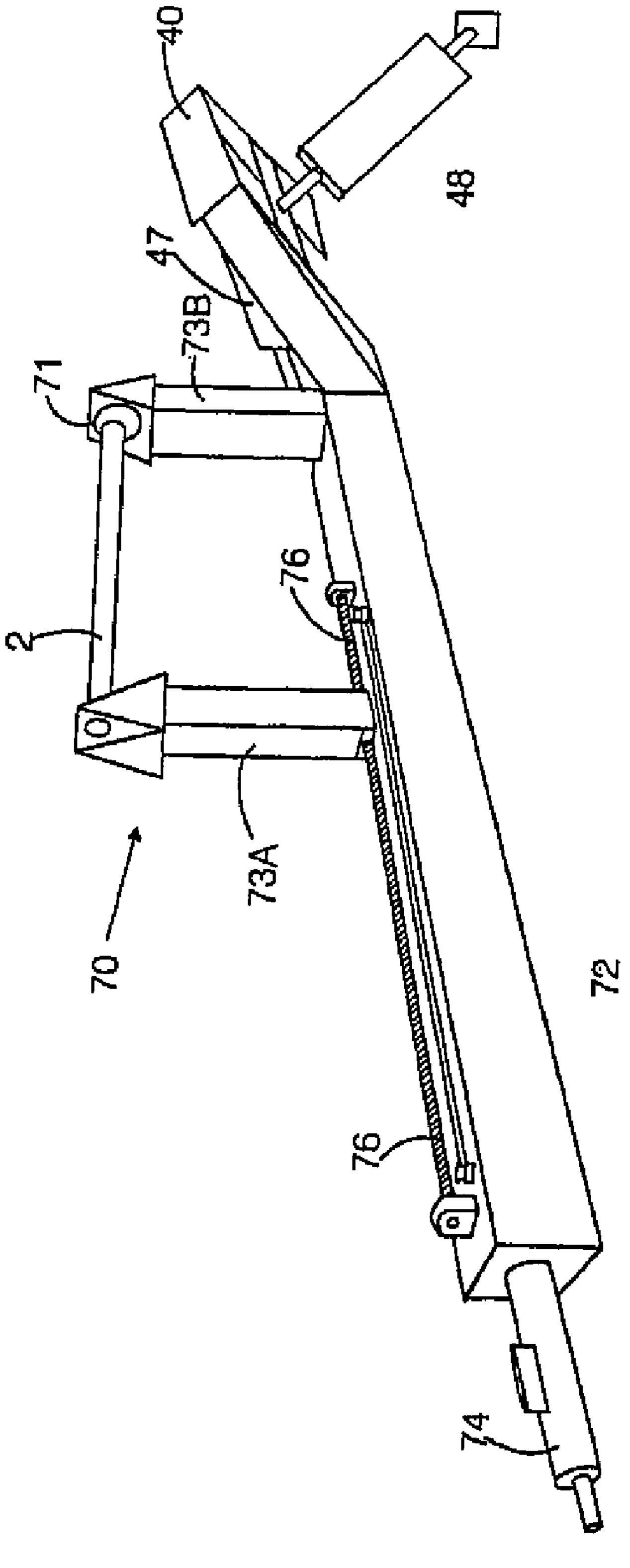
FIG. 5 is an illustration of the load-bearing unit.

FIG. 5 shows the load-bearing unit 70 in greater detail. For purposes of illustration, the positioning assembly 40 is shown assembled at the first end 10A only of the saw apparatus 10. One of the load arms 73 is an adjustable load arm 73A and the other one is a fixed load arm 73B. As shown, the adjustable load arm 73A is mounted on a threaded rod 76 that extends above the top face 72A of the load beam 72. Also shown in the fixed load arm 73B is the safety chuck 71. The adjustable load arm 73A is also equipped with a chuck. Conventional roll shafts are provided in a variety of standard lengths and the adjustable load arm 73A is positionable at any point along the threaded rod 76 in order to accommodate the length of the particular roll shaft 2 being used with the roll 1 to be cut. A hydraulic motor is used to position the adjustable load arm 73A along the rod 76. Such means are well known in the field and are not shown. The load arms 73 securely hold the roll 1 in the proper position for measuring a distance from the end of the roll and for cutting by preventing the roll 1 from shifting longitudinally during the cutting operation. Any shift along the longitudinal axis of the load beam 72, even a minimal one, would cause the saw blade 24 to bind and would create a ragged end cut on the roll 1.

The journal 74 for mounting the beam-positioning assembly 70 is shown in FIG. 5 at one end of the load beam 72. Note that the journal 74 is keyed. Another similar journal 74 extends from the other end of the load beam 72. Each journal 74 is supported by a support bearing 42. One positioning assembly 40 is mounted on each journal 74. Refer to FIG. 1 for an overview of the positioning assemblies 40 in the saw apparatus 10, each positioning assembly 40 comprising two positioning arms 44, rotatably mounted on the journal 74 that extends from each end of the load beam 72.

Figure 7:
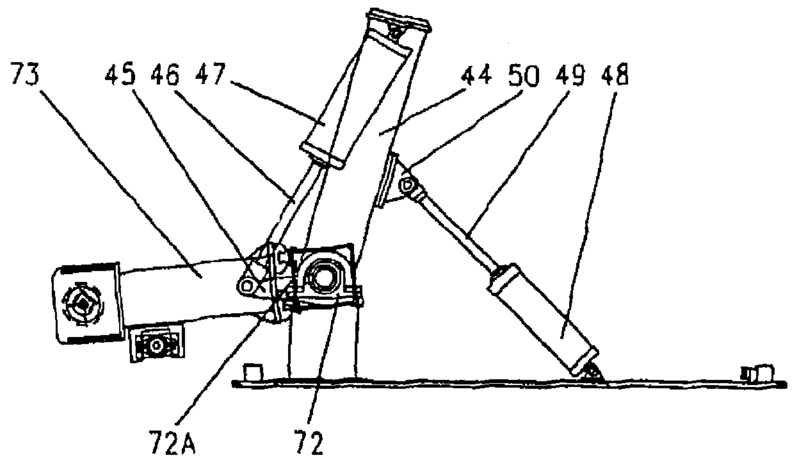
FIG. 7 is a perspective rear view of the positioning assembly.

The positioning assembly 40 will next be described, with reference to FIGS. 1, 3, and 5-7. FIG. 5 is an illustration of the load journal 74 on the load beam 73 and shows one of the positioning assemblies 40 mounted on the load beam. The load journal 74 is shown mounted on support bearings 42 and the beam-positioning arms 44 mounted on the journal 74 so as to rotate freely about the journal 74. A lever arm 45 (shown in FIG. 1) is keyed at one end to the journal 74 and linked at the other end with a first cylinder unit 47, which is pivotably linked to the beam-positioning arms 44. A second cylinder unit 48 is mounted on the floor on the back side of the apparatus 10, as shown in FIG. 7, and is rotatably linked to a bracket 50 that connects the beam-positioning arms 44. Actuating the first cylinder unit 47 assembly forces the beam-positioning arms 44 to rotate about an axis parallel and concentric with the longitudinal axis of the journal 74, between a roll-pickup position at the operator side 10C, shown in FIG. 3, and an intermediate position, in which the load arms 73 are substantially vertical or tilted slightly toward the back side 10D. Actuating the second cylinder unit 48 assembly forces the beam-positioning arms 44 to rotate the load beam 72 into a cutting-operation position, with the load arms 73 extending toward the back side 10D, holding the roll 1 reading for the sawing operation. The cylinder units 47 and 48 are most suitably hydraulically operated by conventional means, which are not shown herein.

Figure 8:
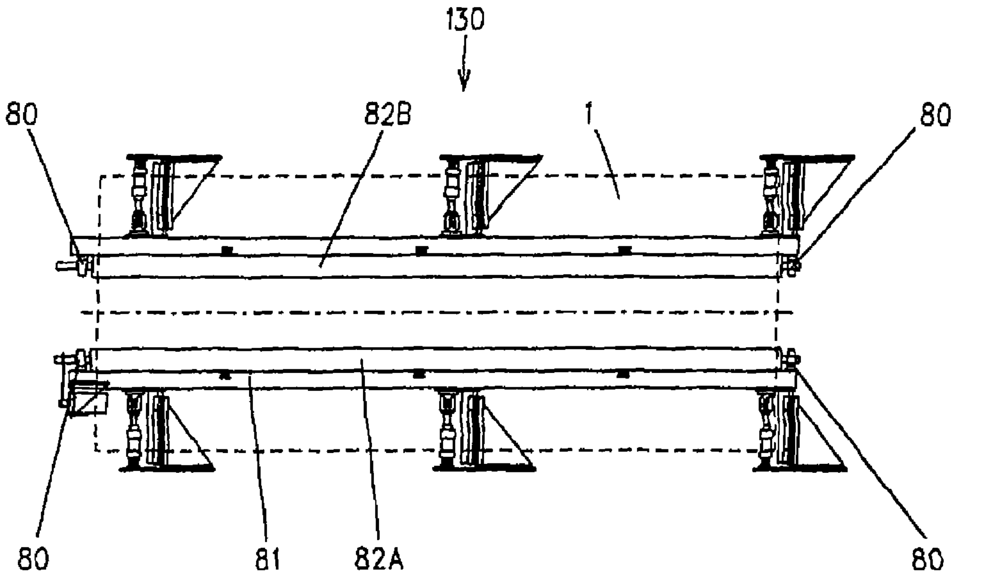
FIG. 8 is a top view of the support bed.

The load-bearing unit 70 with the load arms 73 provides a support means for the roll 1. Because of the tremendous weight and/or the length of the roll 1, there is a danger that the roll shaft 2 may deflect under the force of the sawing operation. It may be advisable then to provide a floor-mounted support means to relieve the roll shaft 2 of the weight of the roll 1 as it is being cut. To this end, a support bed 130 is provided, as shown in FIGS. 2 and 8. The embodiment of the support bed 130 shown has two rows of supports 80. In the configuration shown in FIG. 2, the supports 80 are angled in toward the center of the support bed 130 to form an inversely V-shaped support bed 130. This configuration reduces the possibility that the weight of the roll 1 will cause the supports 80 to deflect. It is critical that the roll rotate during cutting, thus, a means of rotation 82 is provided at the top of each row of supports 80. The means of rotation 82 shown in FIG. 8 are a pair of long rollers 82A,82B, each roller of which extends substantially the length of the support bed 130 and allows the roll 1 to rotate while being supported by the support bed 130. The roll shaft 2 is rotatably driven in the safety chucks in the load arms 73 and the long rollers 82A,82B are free-rolling. In a different configuration, the roll shaft 2 is free-rolling within the safety chucks and the means of rotation 82 rotatably drive the roll 1 on the support bed 130. In this configuration, one of the long rollers 82A,82B is a driving roller and the other one a freely-rotating roller. The embodiment of the support bed 130 shown in FIG. 2 includes supports 80 that are adjustable in height and are pivotably mounted on the floor, so that they may adjusted to accommodate the diameter of the specific roll to be cut.

Figure 9:
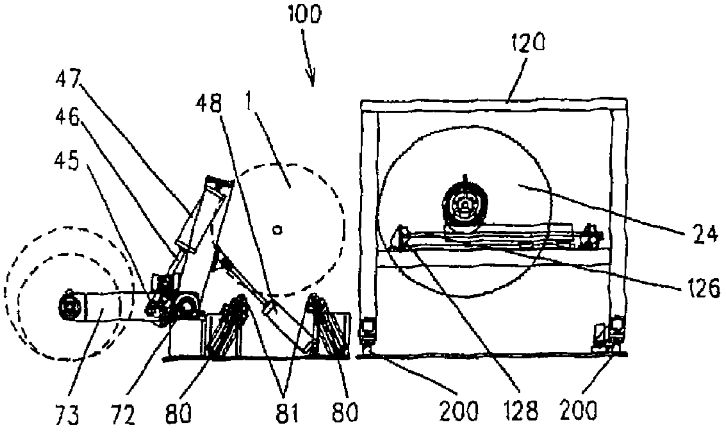
FIG. 9 is a front view of the second embodiment of the apparatus according to the invention, showing a floor frame to hold the saw blade.
Figure 10:
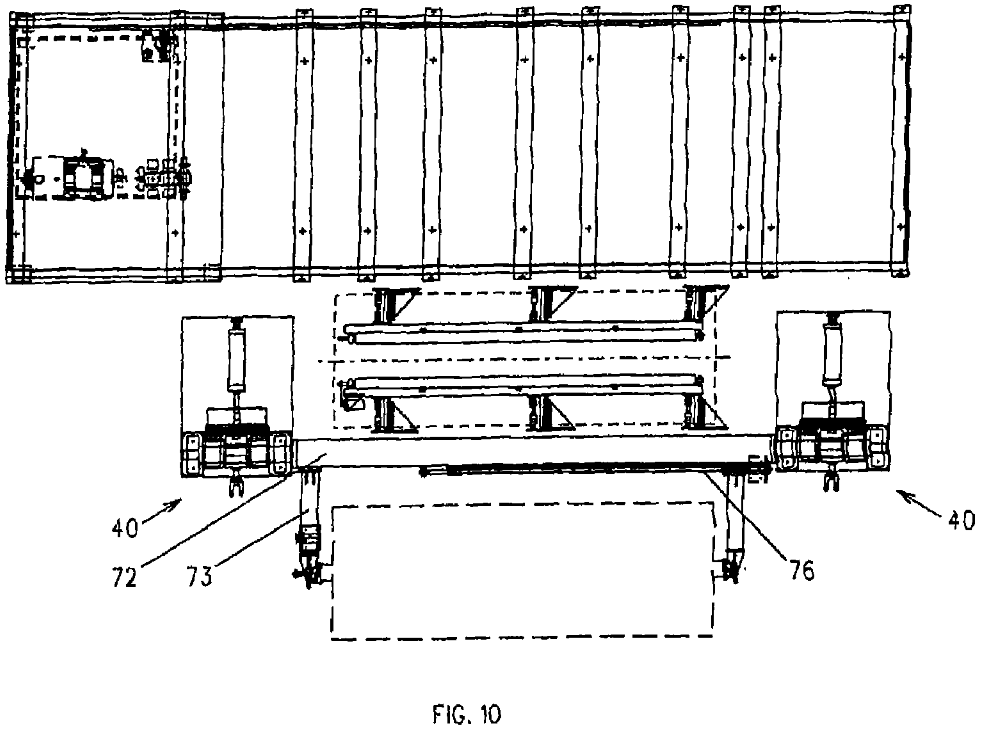
FIG. 10 is an end view of the apparatus according to FIG. 9.

A second embodiment of a saw apparatus 100 according to the invention is shown in FIGS. 9 and 10. The primary difference between the first and second embodiments is that the roll 1 is not cut from above, but from the side. The load-bearing unit 70, the positioning assemblies 40 and the support bed 130 are essentially the same as those described in the first embodiment. A modified saw frame 120 is mounted on a carriage system 200 and travels alongside the roll 1 such that the saw blade 24 also travels alongside the roll. Ideally, the center of the saw blade 24 at a height that is approximately the same as the center of the roll shaft 2. Instead of lowering the saw blade 24 from above into the roll 1, as is done in the first embodiment of the saw apparatus 10, the saw blade 24 is moved horizontally inward from the side toward the center of the roll 1.

FIG. 9 is an end view of the saw apparatus 100, showing the load beam 72, the positioning assembly 40, the support bed 130, the carriage system 200, and the modified saw frame 120. The roll 1 is shown being lowered into position in the support bed 130. The modified saw frame 120 includes a threaded rod 126 that is mounted in the saw frame 120 such that it extends transverse to the longitudinal axis of the roll 1. Similar to the carriage system 100 shown in FIG. 3, the carriage system 200 includes carriage rails 112 and a gear rack 114. The saw blade 24 is mounted on the threaded rod 126 and is drivable thereon in toward the roll 1.

The apparatus 100 may be equipped with auxiliary systems, such as a lubricating system for cooling the blade and a dust-collection system for collecting the waste particles freed by the sawing operation. In tests conducted by the Applicants, it was found that the ACCU LUBE™ lubricant, applied to the saw teeth by means of a spray system directed at the top of the blade, was already dry when the teeth at the top had rotated down to the cutting surface and that the blade was cool to the touch. The fact that the lubricant is dry before the treated teeth touch the material to be cut reduces the chances of the lubricant staining or damaging the material on the roll. Because the blade is so large, the rate of heat transfer away from the teeth into the body of the saw is extremely rapid, and, depending on the type of material being cut, lubricant may not be needed.

Figure 11:
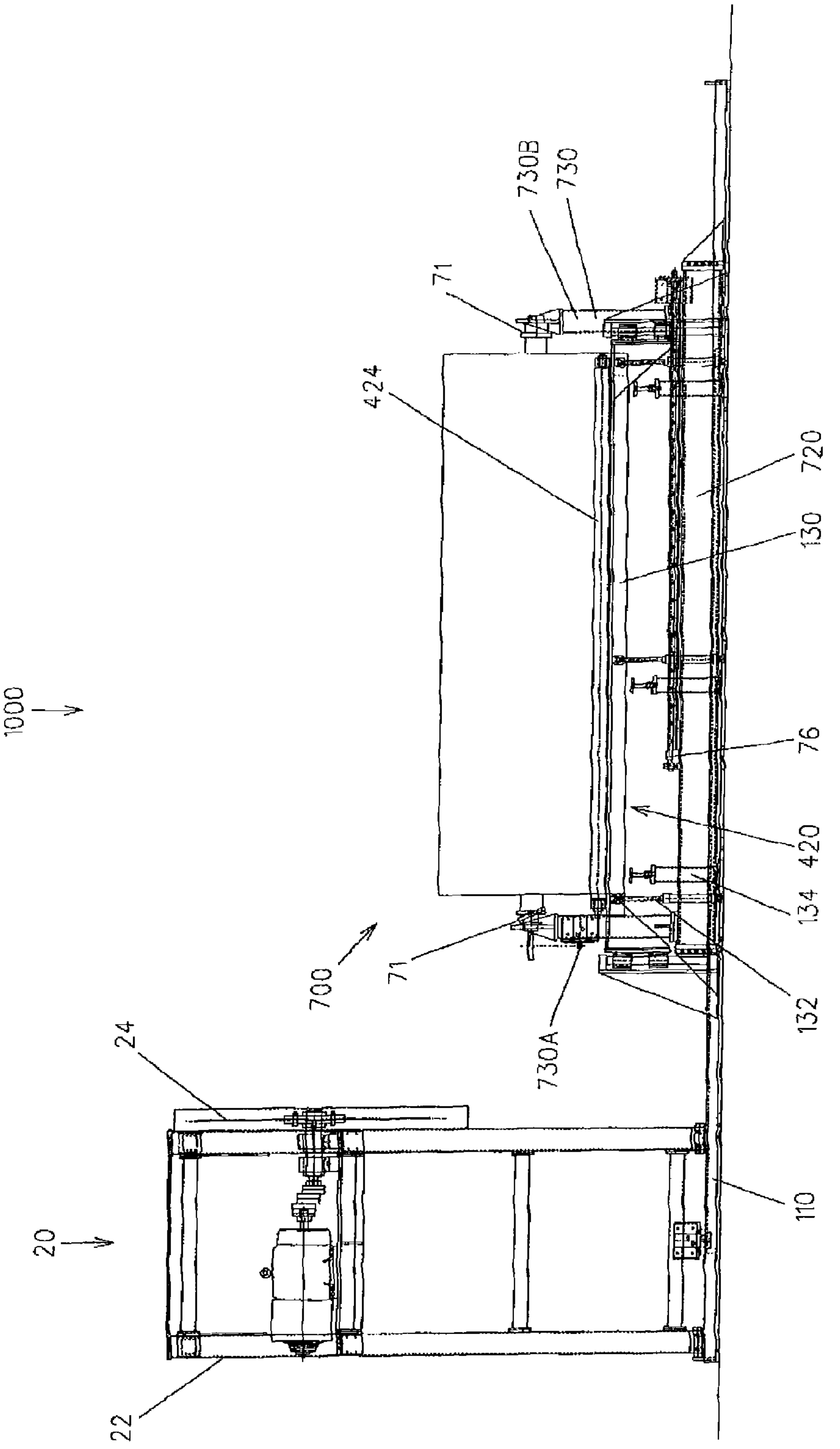
FIG. 11 is a side view of a third embodiment of the apparatus according to the invention, showing the saw tower, the stationary load beam, and an adjustable support bed.
Figure 12:
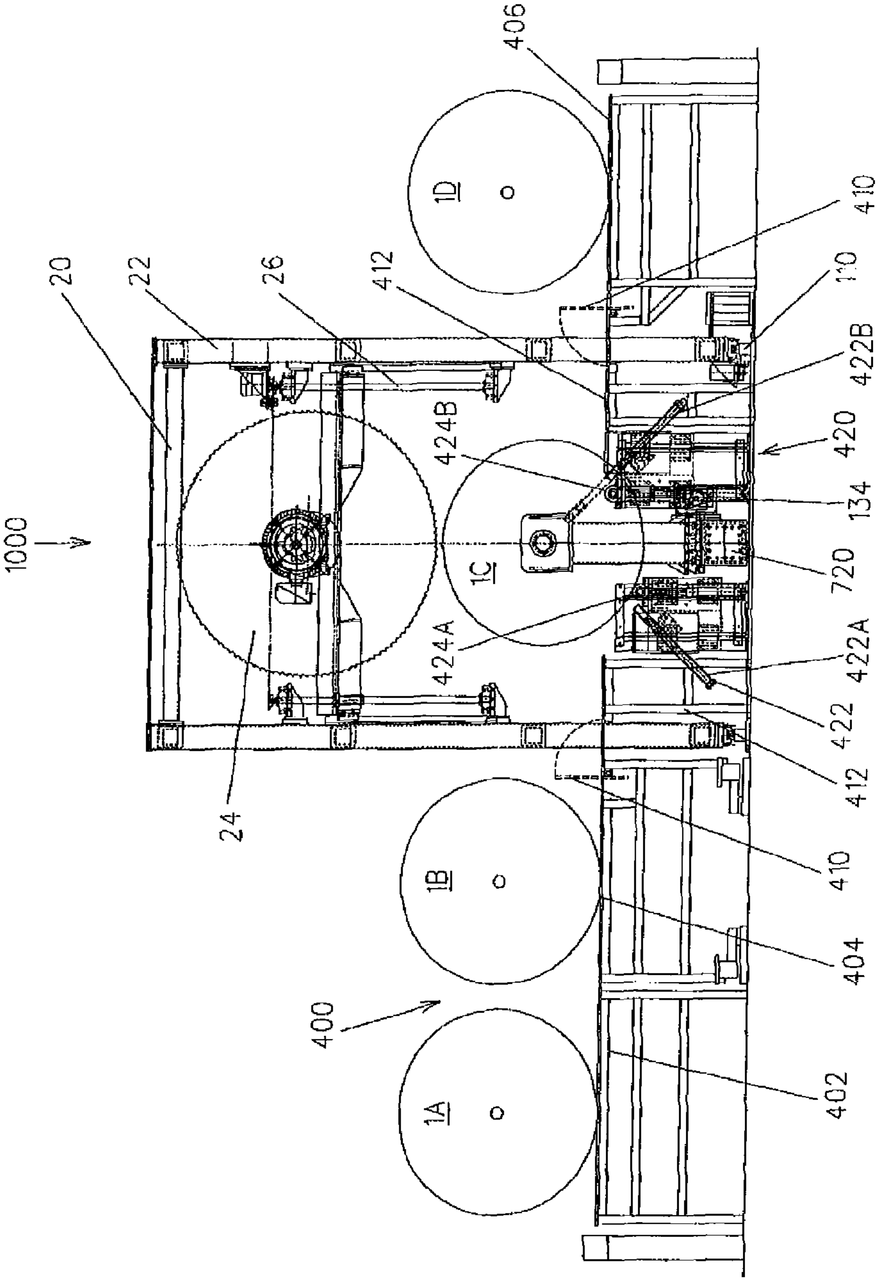
FIG. 12 is an end view of the embodiment of FIG. 11, showing the configuration of load and exit tables.
Figure 13:
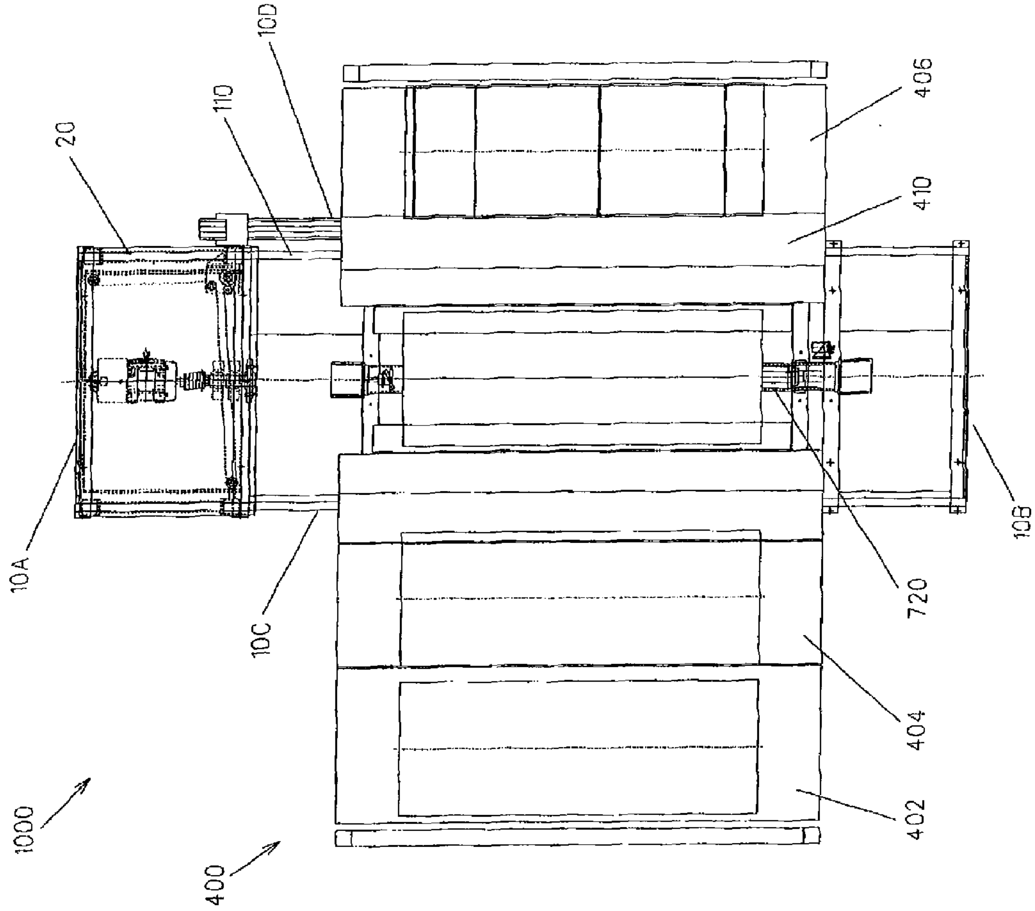
FIG. 13 is a top view of the embodiment of FIG. 11, showing load and exit tables.

FIGS. 11-13 show a third and preferred embodiment of a saw apparatus 1000 according to the invention. Saw apparatus 1000 comprises the saw unit 20, and the carriage system 110 described above, a load-bearing unit 700, a loading/unloading means 400, and a roll-placement means 420. The loading/unloading means 400 includes at least a load table 402 and an exit table 406. The load-bearing unit 700 includes a load beam 720 and two load arms 730, each with a safety chuck 71. The safety chucks 71 may be either shaftless chucks that are sized appropriately to receive and securely hold the ends of the core 3, or chucks that receive and securely hold a roll shaft that is inserted in the core 3. The load beam 720 is similar to the load beam 72 described above, but is stationary within the saw apparatus 1000 and does not rotate. The load arms 730 are mounted on the load beam 720. These arms are similar to the load arms 73, but are height-adjustable, allowing the safety chucks 71 to be adjusted in height to receive and hold the roll 1 when it is placed in the load-bearing unit 700. In the embodiment shown in FIGS. 11-13, a second load arm 730B is slidably mounted on the threaded rod 76 that is mounted on the load beam 720 and the first load arm 730A is fixedly mounted on the load beam 720. It is, of course, possible to provide a second threaded rod 76 or other slide means for the first load arm 730A and to allow both load arms 730 to move along the load beam 720 to accommodate the width of the paper roll 1.

The key differences between the first embodiment of the saw apparatus 10 and the preferred embodiment of the saw apparatus 1000 lie in the loading/unloading means 400 and the roll-placement means 420, shown in FIGS. 11 and 13. In this preferred embodiment, the paper roll 1 is placed on the load table 402 and rolled in the direction of the load beam 720. The various positions of the paper roll 1 are designated 1A-1D, as shown in FIG. 12. A weigh table 404 is provided as an optional addition, for weighing the paper roll 1 before it is processed. A hinged bridge section 410 bridges the distance from the edge of the load table 402 or the weigh table 404 over the carriage system 110 to a support frame 412. The bridge section 410 is folded up out of the way once the paper roll 1 is situated in position 1C in the load-bearing unit 700, to allow the saw unit 20 to travel on the carriage system 110 to the desired position.

The roll-placement means 420 includes the support bed 130 with support rollers 424 and kicking cylinders 422, as best seen in FIGS. 11 and 12. The support bed 130 is supported by hydraulically actuated support-bed cylinders 132 and has two positions, a raised position at the top of the stroke of the hydraulic support, and a lowered position, in which the support-bed cylinders 132 are lowered onto stops 134, to relieve the load from the load arms 730 during the cutting operation. The kicking cylinders 422A and 422B and the support rollers 424A and 424B are shown in a loading position, ready to receive the paper roll 1. The kicking cylinders 422A and the support roller 424A are in a lowered position, and the kicking cylinders 422B and the support roller 424B in a raised position, a configuration which prevents the paper roll 1C from rolling onto the exit table 406. Once the paper roll 1 has rolled free of the entrance table 402 or weigh table 404 and the support frame 412 and is in position 1C, the kicking cylinders 422B and the support roller 424B are lowered. The paper roll 1 is now resting on the support rollers 424 that allow the roll 1 to rotate. After the cutting process has been completed, the support rollers 424 and the kicking cylinders 422A are raised to kick the cut rolls out onto the exit table 406, shown as position 1D, whence they are picked up by a clamp truck.

Figure 14:
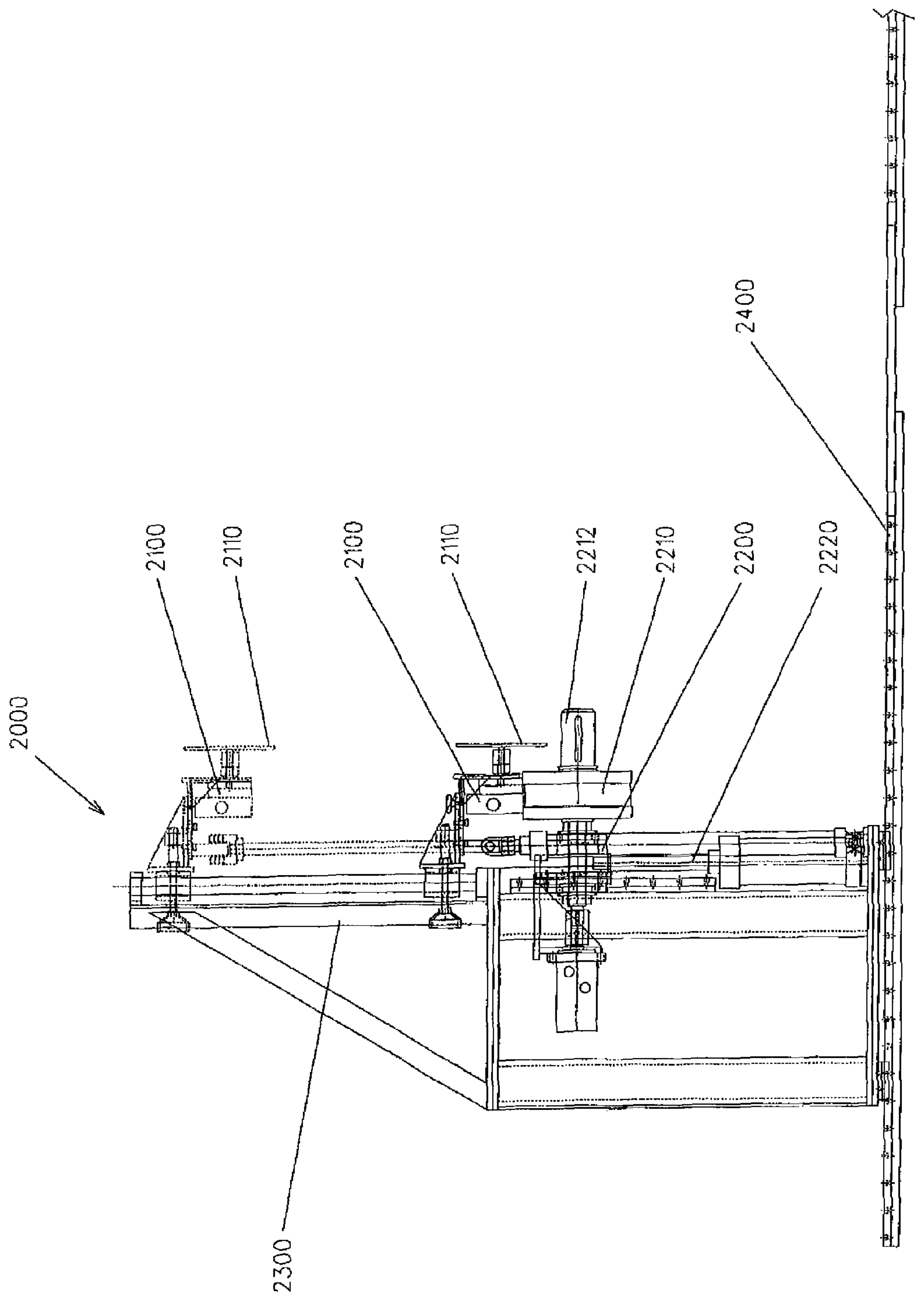
FIG. 14 is an illustration of a finishing station, shown from the operator side.
Figure 15:
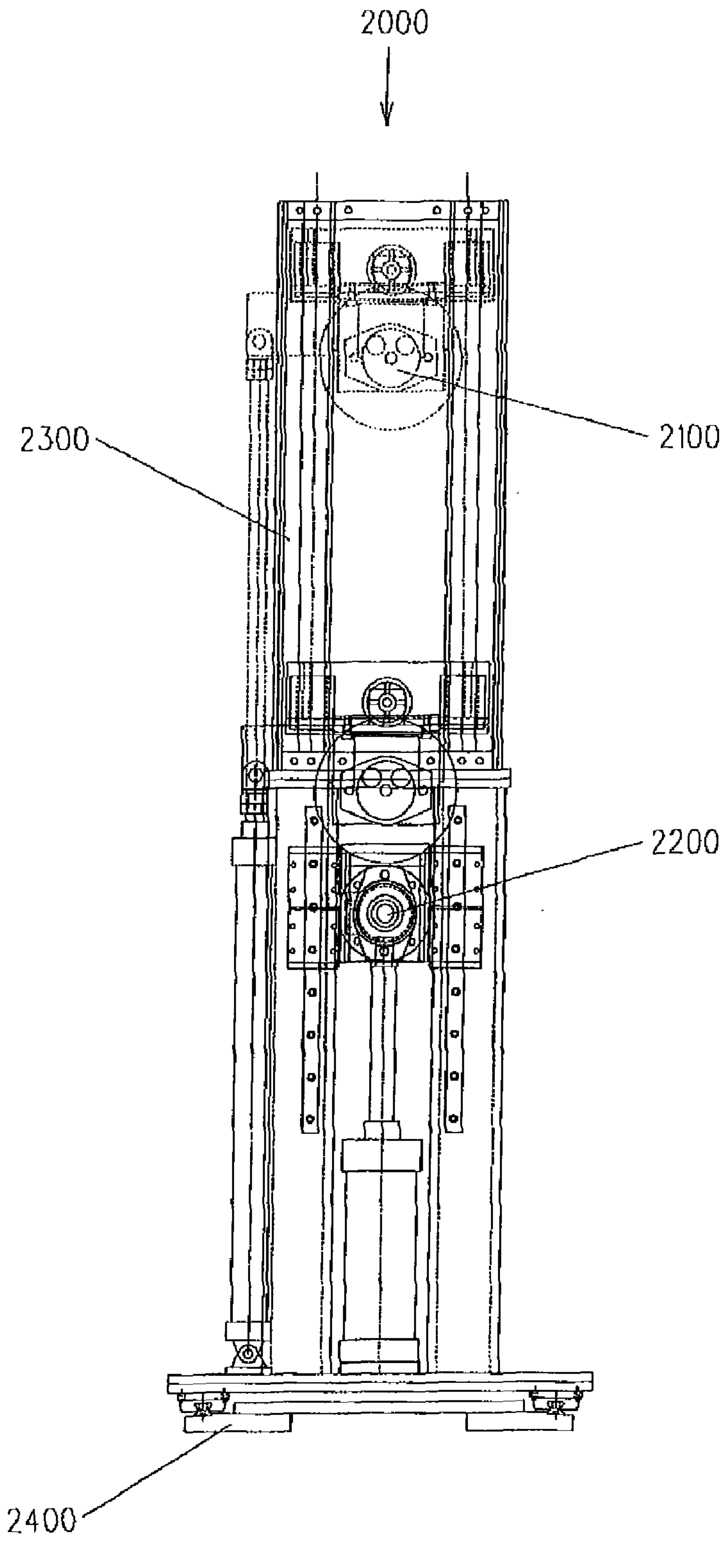
FIG. 15 is an end view of the finishing station of FIG. 14.
Figure 16:
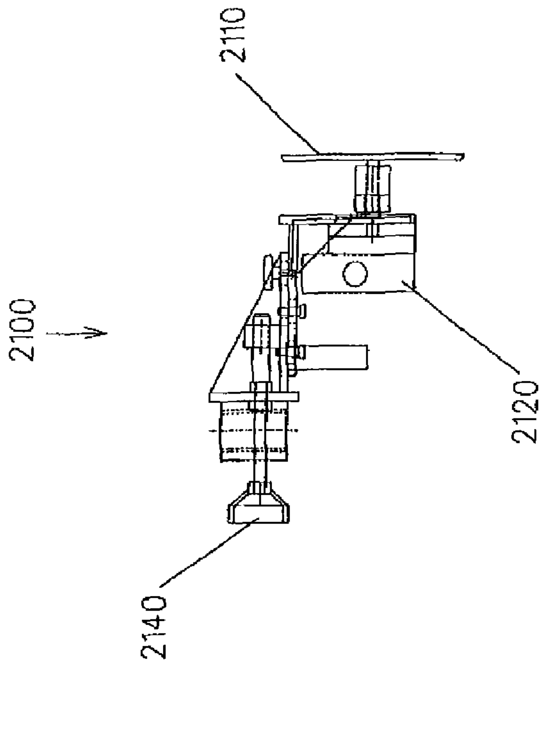
FIG. 16 is an illustration of the sander unit.

Most cut rolls are ready for use, without further processing. In some cases, however, extremely smooth ends are desired. It is within the scope of the invention to provide a finishing station 2000 that will sand the ends of cut paper rolls to the desired degree of smoothness. FIGS. 14 and 15 illustrate a portion of the finishing station 2000, comprising a sander unit 2100, a roll-lifting assembly 2200, fitted with a shaftless chuck 2210 with a nose 2212, a finishing station tower frame 2300, and a finishing-station carriage system 2400. FIG. 16 shows details of the sander unit 2100 and FIG. 17, details of the shaftless chuck 2210.

As shown in FIGS. 14 and 15, the tower frame 2300 is mounted on the finishing-station carriage system 2400. Although only one tower frame 2300 is shown, it should be understood that a second tower frame 2300 may be mounted at the opposite end of the carriage system 2400. One or both of the tower frames 2300 travels along the carriage system 2400 to adjust the distance between the two roll-lifting assemblies 2200 to receive and hold the cut paper roll 1D. Alternatively, if the normal paper-roll processing will be post-treating relatively small cut rolls of paper, only one tower frame is required.

With continued reference to FIGS. 14 and 15, the sander unit 2100 is mounted in the upper half of the tower frame 2300 and the roll-lifting assembly 2200 in the lower half. The sander unit 2100 is shown in two positions: a sanding position, in which the sander unit 2100 is located just above a shaftless chuck 2210 and, in dashed lines, in a home position, in which the sander unit 2100 is retracted to a raised position, The nose 2212 on the shaftless chuck 2210 is sized for insertion into the core 3 of the cut paper roll 1D and is provided with expandable lugs or buttons, which are inflated to ensure that the paper roll 1D does not rotate relative to the nose 2212.

FIG. 16 shows details of the sander unit 2100, which includes a sanding disc 2110, a handwheel 2140, a hydraulic motor 2120. The handwheel 2140 is used to adjust the amount of material that is to be removed from the end of the cut paper roll 1D.

Figure 17:
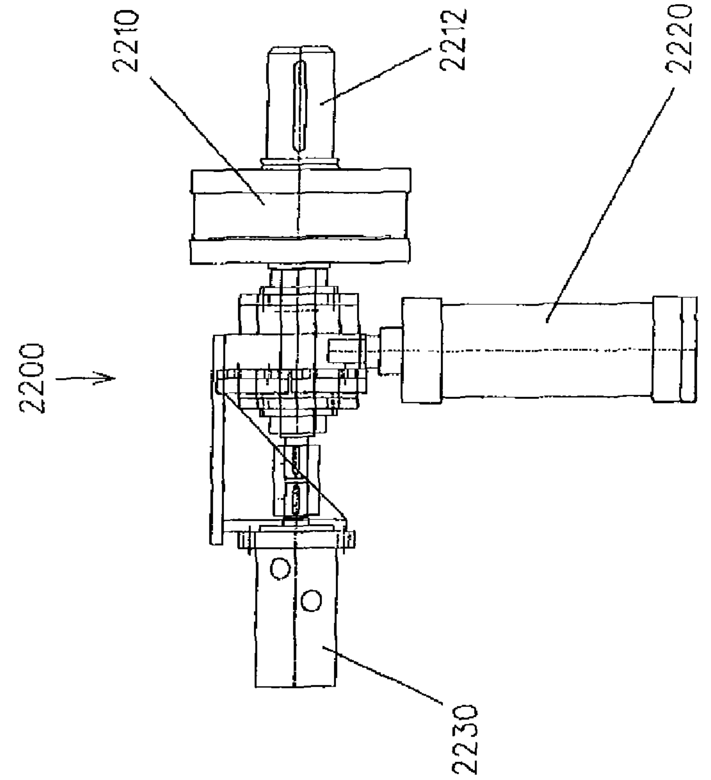
FIG. 17 is a side view of the roll-lifting mechanism.

FIG. 17 shows details of the roll-lifting assembly 2200. The shaftless chuck 2210 is mounted on bearings on a hydraulic cylinder 2220, which is driven by a hydraulic motor 2230. The nose 2212 is inserted into the core 3 of the cut paper roll 1D.

The scope of the invention encompasses a paper roll processing system in which the saw apparatus 100 or 1000 and the finishing station 2000 are integrated into a paper roll processing line. The cut paper roll 1D, after being kicked out onto the exit table 406 is rolled into position before the roll-lifting assembly 2200, which is adjusted in height so that the nose 2212 is aligned with the core 3. The cut paper roll 1D is then mounted on the nose 2212 and the end of the roll sanded to the desired smoothness finish.

The detailed description of the invention includes descriptions of specific embodiments of the apparatus and the method of cutting a roll. It shall be understood, however, that a person skilled in the art is capable of implementing many variations and modifications of the invention without straying from the intended scope of the present invention as presented in the following claims.

What is claimed is:

1. A method of cutting a roll of material having a roll axis, a roll diameter, and a roll width, the method comprising the steps of:

a) rotatably supporting the roll of material in a horizontal plane on a support system that includes two parallel support rollers, wherein the parallel support rollers are long rollers having a length at least as long as the roll width, and, when placed on the support system, the roll axis of the roll of material is aligned parallel with the parallel support rollers;

b) providing a saw in a re-positionable tower, such that the saw is re-positionable relative to the support system;

c) selectively moving the saw to a desired location of cut on the roll, wherein the desired location of cut is selectable at any location along the roll width, and wherein the saw has a circular saw blade with a radius sufficiently large to cut through the roll;

d) cutting through the roll of material in a single-pass cutting operation at the desired location of cut without having to remove cut material during the cutting, thereby providing a press-ready roll having a finished cut end at the desired location of cut.

2. The method of claim 1, further comprising the steps of e) selectively re-positioning the saw at one or more subsequent desired locations; and f) cutting through the roll at each of the subsequent desired locations, without re-positioning the roll and without having to remove previously cut material.

3. The method of claim 1, wherein the support system has a longitudinal axis that is parallel to and equidistant from the parallel rollers, the method further comprising the step of g) providing a longitudinal positioning means for maintaining a desired longitudinal alignment of the roll on the parallel rollers relative to the longitudinal axis.

4. The method of claim 3, wherein the roll of material has a core and the longitudinal positioning means includes a positioning assembly that is coupled with the core.

* * * * *